United States Patent
Ocke et al.

(10) Patent No.: US 9,171,267 B2
(45) Date of Patent: Oct. 27, 2015

(54) SYSTEM FOR CATEGORIZING LISTS OF WORDS OF ARBITRARY ORIGIN

(71) Applicant: Xerox Corporation, Norwalk, CT (US)

(72) Inventors: Kirk J. Ocke, Ontario, NY (US); Dale E. Gaucas, Penfield, NY (US); Michael D. Shepherd, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 246 days.

(21) Appl. No.: 13/826,188

(22) Filed: Mar. 14, 2013

(65) Prior Publication Data
US 2014/0279732 A1    Sep. 18, 2014

(51) Int. Cl.
*G06F 15/18* (2006.01)
*G06N 99/00* (2010.01)

(52) U.S. Cl.
CPC ................................ *G06N 99/005* (2013.01)

(58) Field of Classification Search
CPC .............................. G06N 5/003; G06F 15/18
See application file for complete search history.

(56) References Cited

U.S. PATENT DOCUMENTS

| | | | |
|---|---|---|---|
| 2009/0094233 A1* | 4/2009 | Marvit et al. | 707/5 |
| 2012/0078873 A1* | 3/2012 | Ferrucci et al. | 707/708 |
| 2013/0013580 A1* | 1/2013 | Geller et al. | 707/706 |

OTHER PUBLICATIONS

'Extracting Named Entities and Synonyms from Wikipedia', Bohn, 2010, 2010 24th IEEE International Conference on Advanced Information Networking and Applications, pp. 1300-1307.*
'Understanding User's Query Intent with Wikipedia': Hu, 2009, WWW 2009 Madrid, ACM 978-1-60558-487-4.*

* cited by examiner

*Primary Examiner* — Kakali Chaki
*Assistant Examiner* — Peter Coughlan
(74) *Attorney, Agent, or Firm* — Fay Sharpe LLP

(57) ABSTRACT

The present disclosure provides for categorization of lists of words. The method comprises querying DBpedia to find the resources related to the given list of words. Once the resources are found, the corresponding media Wikipedia categories can be retrieved, as well as their ancestors, generating a graph of categories. A number of graph analysis algorithms can then be applied to the graph, each returning a selected category. For each algorithm a classifier is trained to decide whether the output of the algorithm is indeed the "best" category. An ensemble weighted majority voting can then be used to select the best category based on votes cast by each classifier. The disclosure demonstrates a more accurate selection of the best category and can include an ensemble majority rated voting algorithm comprising all voting members initially casting one vote; i.e., highest frequency, most frequently occurring word, least common ancestor and centrality measures.

16 Claims, No Drawings

SYSTEM FOR CATEGORIZING LISTS OF WORDS OF ARBITRARY ORIGIN

BACKGROUND

Any application dealing with large amounts of structured data (such as databases and spreadsheets) that benefits from knowing an exact semantic category for the various fields of data can utilize the method to be described hereinafter.

Given a list of words of "arbitrary origin" that are assumed to have one or more categories in common, the problem becomes finding the category that best fits (based on human judgment or other methods) the list of words with enough accuracy to be used in automated data processing applications. In one illustrative example a list of numbers can include (2, 3, 5, 7, 11, 13). The question becomes what is the best category that all of, or most of, the aforementioned numbers belong. At least three categories can be listed: prime numbers; odd numbers; and, positive integers. It appears that the category of prime numbers would be the best category for these numbers. Another illustrative example includes (dog, cat, hamster, gold fish). Two categories that this list belongs to are: pets and animals. It would appear that the aforementioned list is best categorized as pets.

It is to be appreciated that categorizing a list of words of "arbitrary origin" requires a large comprehensive, multifaceted categorization system that reflects how a wide range of people would naturally categorize the words in the list. For example, the category of "Presidents of the United States" or "Assassinated Presidents of the United States" would depend on the particular list of Presidents. One present categorization system involves Wikipedia's crowd sourced "folksonomy" which is used to organize Wikipedia articles using a sense of classification and organization that is agreeable to the authors and other individuals that categorize articles. Wikipedia's classification system is effective for classifying a list of words when there is strong semantic similarity between the words in the list. For example, the classification system is good for categories like: countries, 'Presidents of the USA', and birds. Wikipedia's classification system is not as good for: 'objects found in the sky' or 'people born in January'. There are many applications where knowing what lists of words represent is useful. One such application is the conversion of tabular data into resource description framework (RDF) triples (linked data). An RDF file can parse down to a list of triples. A triple comprises a subject, a predicate, and an object.

Another application is combining two distinct databases into one database where both of the original databases contain records with the same type of information but have different syntactic schemas. The problem being resolved in the present disclosure is the automatic categorization of arbitrary fields in a spread sheet or database to make easier a class of problems like the two described above. Current approaches to this problem typically require a large amount of contextual information about the specific problem in order to create a one off solution that does not generalize well to the entire class of problems in this area.

SUMMARY

A system, to be described hereinafter, is provided that categorizes a list of words with enough accuracy to be considered for use in automated data processing applications. The hybrid system queries DBpedia using the SPARQL query language to get the Wikipedia categories for each word in a list of words (of arbitrary origin). A graph of the categories can be created and then used in combination with network algorithms (centrality measures, least common ancestor, etc.), machine learning techniques (logistic regression, one vs. all classifiers, etc.) and a weighted voting system, from which a category or categories is determined for the list of words. An exemplary working system that categorizes lists of words from arbitrary sources has been built and demonstrated. Presently, the exemplary system is accurate 89% of the time on the test set of data.

DETAILED DESCRIPTION

A general approach to categorize a list of words can comprise using DBpedia to represent Wikipedia since it can be easily queried using SPARQL. This general approach involves querying DBpedia for each word in the list. If the word is in DBpedia as a resource, then the system will find the Wikipedia categories of that resource. The system can then count the number of times each category is returned. If the word requires disambiguation (e.g., Washington), the system will find all possible disambiguated resources, find the Wikipedia categories for each resource, and count the number of times each category is returned, but only if that category was already found in the previous step (i.e., limits the dispersion from disambiguated resources). A frequency distribution can be created of the categories with respect to the number of words in the list that have a DBpedia resource. The table below outlines the general approach using a list of birds from the Jasper Ridge Biological Preserve.

BIRDS EXAMPLE

| BIRDS | CATEGORIES |
| --- | --- |
| Pied-billed Grebe | Birds_of_the_United_States: (0.6) |
| Double-crested Cormorant | Birds_of_North_America: (0.446) |
| Green Heron | Birds_of_Mexico: (0.446) |
| Snowy Egret | Birds_of_Canada: (0.4) |
| Great Egret | Birds_of_Central_America: (0.215) |
| Great Blue Heron | Birds_of_Baja_Peninsula_Mexico: (0.2) |
| Mallard | Native_birds_of_Alaska: (0.184) |
| Cinnamon Teal | Fauna_of_the_California_chaparral_and_woodlands: (0.153) |
| Ruddy Duck | Native_birds_of_the_Pacific_region_U.S.: (0.123) |
| Wood Duck | Animals_described_in_1758: (0.123) |
| Forster's Tern | Birds_of_Puerto_Rico: (0.123) |
| Turkey Vulture | Birds_of_Guatemala: (0.107) |
| | Birds_of_Europe: (0.076) |
| ... | Birds_of_Saint_Pierre_and_Miquelon: (0.076) |
| | Fauna_of_the_Sierra_Nevada_(U.S.): (0.061) |

As a first consideration, a highest frequency category (i.e., the category that appears most often) can be evaluated to determine if it is sufficient to categorize the list. Typically the highest frequency category is the best category about half of the time (50-60%). Analysis of results shows that for any given list of words there are multiple systems of classification that overlap the list of words (e.g. birds and fauna). There is on average a classification system for approximately every seven words in any given training set. The highest frequency category is useful, but it is not generally viewed as the most effective individual category due to its accuracy of 50-60%.

Another alternative methodology involves categories that utilize the most frequently occurring word (noun) that occurs in a given database. The most frequently occurring word category can provide the best answer 40-50% of the time. The most frequently occurring word category, as an independent category, is useful but alone results in the best answer less than the highest frequency category and less than desirable ultimately. However, when comparing when the best category is the most frequently occurring word category to when it is the highest frequency category, typically results in that when one is right, the other is usually wrong.

In order to create a better categorization, an ensemble weighted majority voting methodology can be incorporated which utilizes more voting members (i.e. categories). An ensemble learning methodology using weighted majority voting is a technique that can be used to improve the performance of a model by combining the strength of the individual components of the model in a way that arrives at a better result than the individual components alone. In order to create an ensemble one could utilize more categories in addition to the highest frequency category and the most frequently occurring word category.

From existing categories a graph can be created by using ancestor (broader) categories for each list and then linking them all together. Graph and network theoretic concepts can provide a set of new potential voting members in the ensemble. For example, network centrality measures such as betweeness, closeness, eigenvector, and BaryCenter can be utilized. Additionally, a least common ancestor which incorporates the highest aggregate frequency can be incorporated.

Nodes in a network with a high betweeness centrality measure are on a high proportion of the paths between other nodes in the network. In social networks this is commonly understood to mean a person (node) that acts as a "broker" or "gateway" between other parts of the network. Thus, ensemble majority weighted voting algorithm could include all voting members (categories) initially cast one vote: for example, highest frequency category, most frequently occurring word, betweeness, closeness, Barycenter, and eigenvector.

Although the aforementioned model improves the overall accuracy of determining the best category, additional variables can be incorporated to improve the overall results. The additional variables can include finding the least common ancestor in the graph that covers the largest aggregate frequency of the original categories. Intuitively this is the most general, but not overly general, ancestor category of the initial categories that covers more of the frequency distribution than any other.

Overall, many features can be assessed regarding the categories described above. For example, the list of features that can be analyzed comprise: percentage of categories from disambiguated resources, ratio of categories to resources used, percent resources covered by least common ancestor with largest aggregate frequency category, the in degree of highest frequency category, the out degree of highest frequency category, the in degree of least common ancestor with largest aggregate frequency category, the out degree of least common ancestor with largest aggregate frequency category, the number of least common ancestors (independent of aggregate frequency), and the size of the graph for least common ancestor with largest aggregate frequency category. For each method, such as the highest frequency category, the system can utilize a trained classifier using conjugate gradient and a logistic cost function to predict when that method determines the right answer. The method can be divided into three elements comprising training, cross validation and a test set.

In practice, the method outlined above could comprise the following process: building a category graph using DBpedia to represent Wikipedia data; using the results of SPARQL queries to build a graph comprising all the categories and ancestor categories for each word in the list; using the graph to infer the best category using various algorithms; using simple straight forward algorithms to determine the best category for a word list resulting in a set of categories (one for each algorithm) representing the best categories for the list of words; training individual classifiers, using logistic regression, to classify when each of the various algorithms found the best category, wherein each classifier is trained to answer the following question: "did the algorithm in question find the best category (yes or no?); and, using ensemble weighted majority voting to select the best category based on votes cast by the trained classifiers.

An illustrative example can be partially outlined as follows for a list of roller coaster names. The list of roller coaster names can include at least the following listed coasters:

Nitro
Millennium Force
Space Mountain
Goliath
Griffon
SheiKra
Top Thrill Dragster
California Screamin'
Alpengeist
Maverick
Vortex
. . .

The list of categories, and frequency of occurrence, that result from the list above follows (categories used to build the category graph):

:Six_Flags_roller_coasters: (0.2028985507246377)
:Steel_roller_coasters: (0.11594202898550725)
:English-language_films: (0.11594202898550725)
:Six_Flags_Great_Adventure: (0.10144927536231885)
:Roller_coasters_in_California: (0.10144927536231885)
:Six_Flags_Magic_Mountain: (0.08695652173913043)
:American_films: (0.08695652173913043)
:Cedar_Point: (0.08695652173913043)
:Roller_coasters_in_New_Jersey: (0.07246376811594203)
:Roller_coasters_that_opened_in_1997: (0.057971014492753624)
:Six_Flags_Over_Texas: (0.057971014492753624)
:Cedar_Fair_roller_coasters: (0.057971014492753624)
:Roller_coasters_that_opened_in_1995: (0.057971014492753624)
:Roller_coasters_in_Texas: (0.057971014492753624)
:Roller_coasters_in_the_United_Kingdom: (0.057971014492753624)
:Wooden_roller_coasters: (0.057971014492753624)
:Roller_coasters_that_opened_in_2001: (0.043478260869565216)
:Roller_coasters_that_opened_in_2002: (0.043478260869565216)
:Roller_coasters_that_opened_in_2003: (0.043478260869565216)
:Roller_coasters_that_opened_in_2000: (0.043478260869565216)
:Roller_coasters_that_opened_in_2005: (0.043478260869565216)
:Roller_coasters_that_opened_in_2006: (0.043478260869565216)
:Merlin_Entertainments_roller_coasters: (0.043478260869565216)
:Roller_coasters_that_opened_in_1994: (0.043478260869565216)
:Roller_coasters_in_Ohio: (0.043478260869565216)
:Disney_attractions: (0.043478260869565216)
:Roller_coasters_that_opened_in_1992: (0.043478260869565216)
:Hersheypark: (0.043478260869565216)
:Fictional_cyborgs: (0.043478260869565216)
. . .

Utilizing the highest frequency category and the most frequently occurring word category determinable from the list of categories prior to creating the category graph is as follows: the highest frequency category would result in "Six Flags roller coasters"; and, the most frequently occurring word category would result in "roller coasters". Using the centrality measures to create the category graph and then running existing algorithms described above for each centrality measure provides: barycenter centrality would result in "Six Flags"; betweeness centrality would result in "Amusement parks by country"; closeness centrality would result in "Films by country or language"; and, eigenvector centrality would result in "Visitor attractions in the United States by state". The least common ancestor from the category graph provides a least common ancestor of "roller coasters". As can be seen in this example, the best category for the list of roller coaster names is present in the set of categories determined by the various algorithms, namely, "roller coaster".

A process to combine the strength of all the classifiers is needed, and thus, the ensemble voting system is utilized to provide such a process. Several alternative voting algorithms were examined to find the one that would provide the best results on a cross validation set. One alternative includes an ensemble voting algorithm comprising one versus all. In this manner the classifier with the highest sigmoid value would be used as the best fit category. The second alternative utilized a weighted voting algorithm (logistic regression only). In this manner each classifier was given one vote if a sigmoid value is above a selected threshold (i.e. greater than or equal to 0.50). The highest frequency category was given an extra vote if the sigmoid value was above a larger selected threshold (i.e. greater than 0.85). A third alternative was utilized which comprises a weighted voting algorithm incorporating logistic regression and a heuristic approach. This third alternative was similar to the weighted voting using only logistic regression but incorporated one additional change. The most frequently occurring word category was given one vote only if the highest frequency category sigmoid value is less than or equal to 0.25 and the most frequently occurring word category sigmoid value is greater than or equal to 0.40.

The weighted voting algorithm comprising logistic regression and a heuristic approach provided the most accurate results and obtained the best fit category. Continuing with the roller coaster names example and the weighted voting algorithm described above, the following results were obtained. Applying each classifier for each algorithm and then applying the weighted voting (LR+Heuristic) ensemble weighted voting scheme gives the following results to the seven categories detailed below in Table 1.

TABLE 1

| Algorithm | Best Category | Ensemble Voting Results using Logistic Regression classifiers yes - use the category no - don't use the category | Included Best Category |
|---|---|---|---|
| Highest Frequency | Six Flags | No | |
| Most Occurring Word | Roller Coasters | Yes | Roller Coasters |
| Least Common Ancestor | Roller coasters | Yes | Roller Coasters |
| Betweeness Centrality | Amusement parks by country | No | |
| Barycenter Centrality | Six Flags | No | |
| Closeness Centrality | Films by country or language | No | |
| Eigenvector Centrality | Visitor attractions in the United States by state | No | |

In this example the best fit category unambiguously can be selected as "roller coasters" since it has two votes and there are no other votes in any other category.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method to determine a category that best defines a selected list of words, comprising:
   building a category graph comprising all categories and ancestor categories for each word in the list;
   using said category graph to infer the best category from a series of algorithms;
   training individual classifiers using logistic regression to classify when each of said series of algorithms have found a best category;
   wherein each said classifier is trained to determine whether the selected algorithm found the best category;
   using ensemble weighted majority voting to select said best category based on the votes cast by the trained classifiers;
   wherein inferring said best category includes at least one of:
      determining the most frequently occurring word amongst the category names in the category graph; and,
      determining the category nodes in the category graph with the highest values for a variety of centrality measures.

2. The method of claim 1 further comprising;
   finding a least common ancestor in said category graph that covers the largest aggregate frequency of the original categories; and,
   wherein a set of said least common ancestors generated from the power set of the initial categories is equivalent to the set of all the distinct classification systems relevant to the initial list of words.

3. The method of claim 1 further comprising:
   features used to train the classifiers are selected from the group consisting of: the frequency of the highest frequency category; percentage of time the most frequently occurring word appears; and, ratio of largest aggregate frequency of least common ancestors to cumulative frequency of all categories.

4. The method of claim 1 further comprising:
   the ensemble weighted majority voting includes using the classifier with the highest sigmoid value.

5. A method to determine a category that best defines a selected list of words, comprising:
   building a category graph comprising all categories and ancestor categories for each word in the list;
   using said category graph to infer the best category from a series of algorithms;
   training individual classifiers using logistic regression to classify when each of said series of algorithms have found a best category;
   wherein each said classifier is trained to determine whether the selected algorithm found the best category;
   using ensemble weighted majority voting to select said best category based on the votes cast by the trained classifiers;
   the ensemble weighted majority voting includes using an assignment of one vote to each classifier if sigmoid value is greater than or equal to 0.50; and,
   assigning an extra vote to the highest frequency category if sigmoid value is greater than or equal to 0.85.

6. The method of claim 5 further comprising:
providing a vote to the most frequently occurring word category if the highest frequency category value is less than or equal to 0.25 and the most frequently occurring word appears greater than or equal to 0.40 of the time.

7. A method to determine a category that best defines a selected list of words, comprising:
building a category graph comprising all categories and ancestor categories for each word in the list;
using said category graph to infer the best category from a series of algorithms;
training individual classifiers using logistic regression to classify when each of said series of algorithms have found a best category;
wherein each said classifier is trained to determine whether the selected algorithm found the best category;
using ensemble weighted majority voting to select said best category based on the votes cast by the trained classifiers;
the ensemble weighted majority voting includes using an assignment of one vote to each classifier if sigmoid value is greater than or equal to a first predeterminable threshold; and,
assigning an extra vote to the highest frequency category if sigmoid value is greater than or equal to a second predeterminable threshold.

8. The method of claim 7, wherein the second predeterminable threshold is greater than the first predeterminable threshold.

9. A method to determine a category that best defines a selected list of words, comprising:
building a category graph comprising all categories and ancestor categories for each word in the list;
using said category graph to infer the best category from a series of algorithms;
training individual classifiers using logistic regression to classify when each of said series of algorithms have found a best category;
wherein each said classifier is trained to determine whether the selected algorithm found the best category;
using ensemble weighted majority voting to select said best category based on the votes cast by the trained classifiers; and,
features used to train the classifiers include a percentage of time the most frequently occurring word appears.

10. The method of claim 9, wherein the features used to train the classifiers include a ratio of largest aggregate frequency of least common ancestors to cumulative frequency of all categories.

11. The method of claim 9, wherein inferring said best category includes at least one of:
determining the most frequently occurring word amongst the category names in the category graph; and,
determining the category nodes in the category graph with the highest values for a variety of centrality measures.

12. The method of claim 9, further comprising:
finding a least common ancestor in said category graph that covers the largest aggregate frequency of the original categories; and,
wherein a set of said least common ancestors generated from the power set of the initial categories is equivalent to the set of all the distinct classification systems relevant to the initial list of words.

13. The method of claim 9, further comprising:
the ensemble weighted majority voting includes using the classifier with the highest sigmoid value.

14. The method of claim 13, further comprising:
the ensemble weighted majority voting includes using an assignment of one vote to each classifier if sigmoid value is greater than or equal to a first predeterminable value.

15. The method of claim 14, further comprising:
assigning an extra vote to the highest frequency category if sigmoid value is greater than or equal to a second predeterminable value.

16. The method of claim 15, further comprising:
wherein the second predeterminable value is greater than the first predeterminable value.

* * * * *